L. A. BEAN.
MILK CATHETER AND SURGICAL INSTRUMENT.
APPLICATION FILED FEB. 3, 1917.
1,242,314.
Patented Oct. 9, 1917.
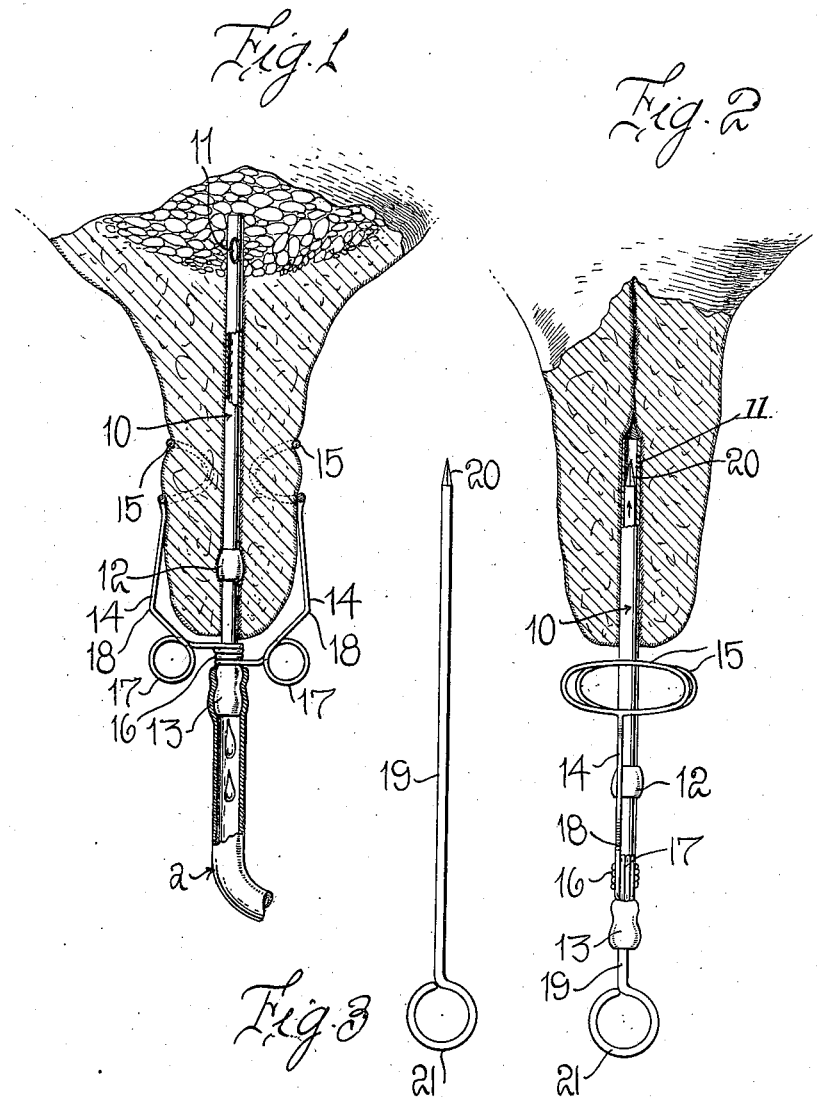
Inventor
L. A. BEAN
By Watson E. Coleman
Attorney

UNITED STATES PATENT OFFICE.

LOUIS A. BEAN, OF DENVER, COLORADO.

MILK-CATHETER AND SURGICAL INSTRUMENT.

1,242,314.   Specification of Letters Patent.   Patented Oct. 9, 1917.

Application filed February 3, 1917. Serial No. 146,421.

*To all whom it may concern:*

Be it known that I, LOUIS A. BEAN, a citizen of the United States, residing at Denver, in the county of Denver and State of Colorado, have invented certain new and useful Improvements in Milk-Catheters and Surgical Instruments, of which the following is a specification, reference being had to the accompanying drawings.

This invention relates to appliances for withdrawing milk from the udders of animals and applying surgical treatment thereto and particularly to devices in the nature of catheters designed to be inserted in the teats of the animal.

One of the objects of this invention is to provide an appliance of this character including a tubular member having means for dilating the teat and means for retaining the tubular member within the teat, so that milk may be withdrawn from the udder of the animal or medicament may be applied thereto.

A further object of the invention is to so construct the tubular member that a rubber or other flexible tube may be connected thereto to thus permit the injection of medicament into the teat.

A further object is to provide resilient retaining members on the tubular member, designed to embrace the teat and hold the instrument in place while the milk is being withdrawn or other operations performed.

Another object is to provide, in connection with the tubular member, a stiletto insertible through the end of the tubular member whereby to pierce and open any obstructions in the teat, so as to allow the tubular member to pass into the teat, the stiletto also forming means whereby medicament, if desired, may be forced through the tubular member and applied to the walls of the milk passage.

Other objects will appear in the course of the following description.

The invention is illustrated in the accompanying drawings, in which:

Figure 1 is a sectional view of the teat showing my implement applied thereto, the implement being partly in section;

Fig. 2 is a like view of Fig. 1, showing the manner in which the implement is inserted in the teat; and Fig. 3 is an elevation of the stiletto.

Referring to these figures, it will be seen that my improved implement comprises a tubular member 10 having a uniform diameter, of any desired length, this tubular member being open at the ends and being provided adjacent one end with an elongated opening 11. The tubular member 10, intermediate its ends, is provided with a bulbous enlargement 12, which is tapered toward the perforated end of the tubular member and constitutes a retaining bulb and dilator. The end of the tubular member away from the opening 11 is formed with an enlargement or bulbous portion 13, which tapers toward the perforated end of the tubular member, this bulbous portion 13 being designed for the purpose of engaging a rubber tubing $a$, whereby medicine may be injected into the tubular member and into the teat and into contact with the walls thereof.

For the purpose of retaining the tubular member in position within the teat, I provide oppositely disposed spring arms designated 14, each of these arms having at their upper ends, the relatively elongated transversely curved teat engaging clips 15, these clips being shown as transversely curved loops formed upon the upper ends of the arms 14. These arms 14 are formed of a single length of resilient wire, the wire being coiled, as at 16, around the outer end of the tubular member and then extended laterally and then bent to form the spring coils 17, and then outwardly extended as at 18, and then upwardly and inwardly extended to the clips 15. These outward bends 18 are formed to accommodate the lower end of the teat, as shown more fully in Fig. 1, so that the spring arms will not pinch upon the teat.

Insertible through the tubular member 10 is a stiletto designated generally 19, which is formed of a straight length of wire pointed at one end, as at 20, and at the other end formed with a finger loop 21. This stiletto, from the junction of its straight portion with the loop 21, is longer than the tube 10 so that the point 20 will project out through the end of the tube.

My device may be used for various purposes and in various ways, thus, for instance, if it is simply desired to withdraw milk from the udder of the animal, the tubular member is inserted, without the stiletto 19, or without the stiletto projecting through the end opening of the tubular member. Then when the tubular member is fully inserted, the stiletto may be withdrawn and if the milk does not flow readily, suction devices may be applied to the extremity of the tubular member to withdraw the milk, or if this is not necessary, the milk may be allowed to flow by gravity through the tubular member. If an obstruction is encountered impeding the insertion of the catheter into the teat of the animal, then the stiletto may be inserted through the tubular member to pierce the obstruction, or otherwise force a passage for the tubular member and then the stiletto will be withdrawn after the implement is fully inserted. If it be desired to apply medicament to the teat or udder, the medicament may be forced in by using the stiletto as a piston, or the outer end of the tubular member may be connected to the rubber tube *a* and the medicament may be injected. It will be noted that the elongated opening 11 will cause the medicament to be applied to the surface of the milk passage and by properly manipulating the implement, the wall of the milk passage may be readily submitted to medication. Furthermore, it will be obvious that morbid fluids which have gathered in the udder may be withdrawn through the tubular member 10 and that after the implement has been inserted in the teat, the stiletto 19 may be withdrawn to permit pus, or other morbid substances to escape. It will likewise be seen that inasmuch as the implement is retained upon the teat by means of the light spring clips, the operator is left free to use both hands for the purpose of injecting medicine into the teat, removing milk therefrom, or removing morbid secretions, or operating the stiletto. The device is very simple, can be cheaply made, and I have found it very efficient in actual practice.

The following advantages due to my instrument may be pointed out: The stiletto 19 punctures the tissue without destroying the same, therefore, leaves no wound to get infected or which has to be healed. The old method of cutting through is very painful and the wound is liable to become inflamed or infected. The opening 11 in the end of the tube 10 allows morbid matter to be withdrawn that otherwise would not pass through and also the teat may be medicated by filling the tube with proper medicine and drawing the tube up and down in the teat with a rotary movement, the side hole applying medication to all infected spots.

The retaining springs 14 with their clamps 15 allow the tube to be retained in place without danger of becoming loose. It is often necessary to retain the tube in place sometimes for several days. Again the device is particularly useful for milking cows with sore teats and also preventing cow-pox which cows catch from the hands of the milker, which infection is very likely to spread through the entire herd. Furthermore the device is particularly useful for milking heifers which have very small teats and for hard milkers and slow milkers and furthermore prevents any infection of the milk itself.

While I have illustrated a certain particular form of my invention which I have found to be thoroughly efficient in practice, yet I do not wish to be limited to the particular details illustrated as it is obvious that these may be modified in many ways, within the scope of the appended claims, without departing from the spirit of the invention.

Having described my invention, what I claim is:

1. A milk catheter comprising a tubular member having a passage extending entirely through it from end to end, one end of the tubular member having an opening at one side, means for retaining the tubular member upon the teat of a cow, and a stiletto having a diameter equal to the interior diameter of the tubular member, pointed at one end, longer than the tubular member and shiftable through the tubular member to project its pointed end beyond the end of the tubular member.

2. A milk catheter comprising a tubular member open at its opposite ends to provide a passage extending from end to end, of the tubular member and also having an opening in its side adjacent one end, oppositely disposed transversely concaved teat embracing clips, and resilient arms extending rearward and outward from said clips, then extending inward, then coiled and then extending inward and attached to the tubular member adjacent its outer end.

In testimony whereof I hereunto affix my signature in the presence of two witnesses.

LOUIS A. BEAN.

Witnesses:
 FRED E. KENTZ,
 HOMER DAVIS BEAN.